US009127592B2

(12) United States Patent
Butzmann

(10) Patent No.: US 9,127,592 B2
(45) Date of Patent: Sep. 8, 2015

(54) RANGE EXTENDER, DRIVE AND MOTOR VEHICLE

(71) Applicants: Robert Bosch GmbH, Stuttgart (DE); Samsung SDI Co., Ltd., Yongin-si, Gyeonggi-do (KR)

(72) Inventor: Stefan Butzmann, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 19 days.

(21) Appl. No.: 13/890,354

(22) Filed: May 9, 2013

(65) Prior Publication Data
US 2013/0300126 A1     Nov. 14, 2013

(30) Foreign Application Priority Data
May 10, 2012   (DE) .......................... 10 2012 207 809

(51) Int. Cl.
| | |
|---|---|
| F02B 63/04 | (2006.01) |
| H02K 7/18 | (2006.01) |
| B60L 11/12 | (2006.01) |
| H02P 9/00 | (2006.01) |

(52) U.S. Cl.
CPC ............... *F02B 63/04* (2013.01); *B60L 11/123* (2013.01); *Y02T 10/7011* (2013.01); *Y02T 10/7077* (2013.01); *Y02T 10/7233* (2013.01); *Y02T 10/7241* (2013.01); *Y10S 903/903* (2013.01)

(58) Field of Classification Search
USPC ............................. 290/1 A; 320/140; 322/45
See application file for complete search history.

(56) References Cited

U.S. PATENT DOCUMENTS

| | | | | |
|---|---|---|---|---|
| 5,247,808 | A * | 9/1993 | Yoshida et al. | 62/228.4 |
| 5,448,154 | A * | 9/1995 | Kanke et al. | 322/28 |
| 5,719,484 | A * | 2/1998 | Taniguchi et al. | 322/20 |
| 6,058,032 | A | 5/2000 | Yamanaka et al. | |
| 6,175,217 | B1 * | 1/2001 | Da Ponte et al. | 322/19 |
| 6,459,175 | B1 * | 10/2002 | Potega | 307/149 |
| 7,002,265 | B2 * | 2/2006 | Potega | 307/149 |
| 7,193,392 | B2 * | 3/2007 | King et al. | 320/118 |
| 7,245,108 | B2 * | 7/2007 | Chertok et al. | 320/132 |
| 7,378,818 | B2 * | 5/2008 | Fowler et al. | 320/119 |
| 7,439,715 | B2 * | 10/2008 | Rozman et al. | 322/45 |
| 7,443,142 | B2 * | 10/2008 | O'Gorman et al. | 322/24 |
| 7,710,081 | B2 * | 5/2010 | Saban et al. | 322/89 |
| 7,830,680 | B2 * | 11/2010 | Eguchi et al. | 363/37 |
| 8,358,111 | B2 * | 1/2013 | Rozman et al. | 322/46 |
| 8,378,623 | B2 * | 2/2013 | Kusch et al. | 320/104 |
| 8,541,989 | B2 * | 9/2013 | Urakabe et al. | 322/23 |

(Continued)

FOREIGN PATENT DOCUMENTS

| | | |
|---|---|---|
| DE | 10 2010 002 168 A1 | 8/2011 |
| DE | 10 2010 027 857 A1 | 10/2011 |

(Continued)

*Primary Examiner* — Pedro J Cuevas
(74) *Attorney, Agent, or Firm* — Maginot, Moore & Beck LLP

(57) ABSTRACT

The disclosure relates to a range extender for a hybrid vehicle configured to be driven by an electric machine. The range extender includes a generator configured to generate electrical energy, an internal combustion engine configured to drive the generator which generates a number N of generator output voltages, and an N-phase rectifier configured to rectify the number N of generator output voltages to form a rectified output voltage. The range extender further includes a direct voltage converter configured to convert the rectified output voltage of the generator.

6 Claims, 1 Drawing Sheet

(56) References Cited

U.S. PATENT DOCUMENTS

| | | | |
|---|---|---|---|
| 8,736,220 B2* | 5/2014 | Ogawa et al. | 318/801 |
| 8,754,543 B2* | 6/2014 | Svensson et al. | 307/46 |
| 8,872,474 B2* | 10/2014 | Scheucher | 320/112 |
| 8,937,822 B2* | 1/2015 | Dent | 363/55 |
| 2003/0085621 A1* | 5/2003 | Potega | 307/18 |
| 2004/0135544 A1* | 7/2004 | King et al. | 320/116 |
| 2004/0135545 A1* | 7/2004 | Fowler et al. | 320/118 |
| 2004/0135546 A1* | 7/2004 | Chertok et al. | 320/118 |
| 2004/0178773 A1* | 9/2004 | Eguchi et al. | 320/140 |
| 2005/0052165 A1* | 3/2005 | Willner et al. | 323/266 |
| 2005/0146308 A1* | 7/2005 | Quazi et al. | 322/28 |
| 2007/0268004 A1* | 11/2007 | Rozman et al. | 322/37 |
| 2008/0068870 A1* | 3/2008 | Eguchi et al. | 363/37 |
| 2008/0191663 A1* | 8/2008 | Fowler et al. | 320/118 |
| 2008/0259666 A1* | 10/2008 | Eguchi et al. | 363/131 |
| 2012/0112693 A1* | 5/2012 | Kusch et al. | 320/109 |
| 2013/0093394 A1* | 4/2013 | Iyasu et al. | 320/109 |
| 2015/0044518 A1* | 2/2015 | Scheucher | 429/49 |

FOREIGN PATENT DOCUMENTS

| | | |
|---|---|---|
| DE | 10 2010 027 861 A1 | 10/2011 |
| DE | 10 2010 064 314 A1 | 7/2012 |
| WO | 2011/085919 A1 | 7/2011 |

* cited by examiner

RANGE EXTENDER, DRIVE AND MOTOR VEHICLE

This application claims priority under 35 U.S.C. §119 to patent application no. DE 10 2012 207 809.6, filed on May 10, 2012 in Germany, the disclosure of which is incorporated herein by reference in its entirety.

BACKGROUND

The present disclosure relates to a range extender for a hybrid vehicle which is driven by an electric machine, a drive for a hybrid vehicle and a motor vehicle having the drive.

A hybrid vehicle is known to be a vehicle which has at least two energy converters and two energy storage systems installed in the vehicle. The energy converters include, for example, electric motors, spark emission engines and diesel engines. The associated energy stores are, for example, batteries and fuel tanks. Hybrid vehicles permit fuel to be saved and at the same time the driving behavior to be improved.

Nowadays, the various hybrid concepts are differentiated in terms of the power classes of their electric drives as follows: micro-hybrid, mild hybrid, full hybrid or plug-in hybrid.

In addition, the following hybrid topologies are differentiated:
  serial hybrid in which, for example, an internal combustion engine drives an electric generator which in turn makes available current to charge a battery or to drive an electric motor to propel the vehicle, wherein the internal combustion engine does not have a mechanical connection to the driven axle of the vehicle,
  parallel hybrid in which either an internal combustion engine alone or an electric motor alone usually provides the propulsion of the vehicle, wherein the internal combustion engine can also drive the electric motor in the generator mode in order to charge the battery,
  power-split hybrid which is distinguished by a planetary gear mechanism which can add the power of the electric motor and that of the internal combustion engine to one another.

An internal combustion engine generator system, in particular in the case of a serial hybrid drive, is also referred to as a range extender.

DE 10 2010 002 168 A1 discloses a range extender for a vehicle which is driven by an electric machine, wherein the range extender has an internal combustion engine which drives a nine-phase generator. The generator feeds a nine-phase bridge rectifier with alternating voltage. The bridge rectifier generates a direct voltage which is applied directly to a lithium-ion battery via a two-conductor line for the purpose of charging. The lithium-ion battery in turn supplies energy to an electric motor in order to drive a vehicle. The known range extender is activated when the lithium-ion battery has reached a low state of charge. As a result, the range extender extends the range of the vehicle.

DE 10 2010 064 314, which was filed before the priority date of the present document and published thereafter also discloses a system for coupling a range extender to a controllable battery which is connected directly to an electric motor. The coupling of the range extender to the battery occurs either directly or via controllable switching elements.

In addition, controllable batteries which are connected directly to an electric motor are known from DE 10 2010 027 857 and DE 10 2010 027 861.

SUMMARY

According to the disclosure, a range extender is made available for a hybrid vehicle which is driven by an electric machine. The range extender comprises a generator for generating electrical energy; an internal combustion engine for driving the generator which generates a number n of generator output voltages; and an n-phase rectifier for rectifying the n generator output voltages to form a rectified output voltage (n is a natural number, preferably higher than 1 and preferably higher than 2). The range extender according to the disclosure is distinguished by the fact that it also comprises a direct voltage converter for converting the rectified output voltage of the generator.

In addition, a drive is made available for a hybrid vehicle. The drive comprises a controlled battery having a number n of battery lines which makes available an n-phase alternating voltage; a first electric machine for driving the hybrid vehicle, wherein the n-phase alternating voltage is present at the first electric machine; and the range extender according to the disclosure, wherein the range extender charges the battery lines in an alternating fashion.

In addition, a motor vehicle, in particular a hybrid vehicle having the drive, is made available.

The range extender according to the disclosure has the advantage that it can provide an adjustable rectified output voltage or a rectified output current by means of the direct voltage converter. It is preferred that the range extender has, in particular, a current sensor and a regulator. The current sensor can sense the rectified output current of the n-phase rectifier, and the regulator can regulate the direct voltage converter as a function of the sensed rectified output current in such a way that a substantially constant output current flows. The rectified constant output current is suitable, for example, for charging batteries, in particular lithium-ion batteries.

According to a further aspect of the disclosure, the direct voltage converter can comprise a step-down converter, also referred to as a buck converter. Step-down converters generally operate particularly efficiently in terms of energy and permit an input voltage to be stepped down into a lower output voltage. Step-down converters typically have a series circuit composed of a periodically switching electronic switch and a free-wheeling diode, wherein a series circuit composed of an inductor and a capacitor is connected in parallel with the diode.

The drive basically permits the battery to be charged by means of the range extender according to the disclosure, and therefore allows the range for hybrid vehicles which are equipped with the drive to be extended. The range extender according to the disclosure additionally permits the controlled battery and, in particular, the battery lines thereof to be charged in an alternating fashion. The battery lines can generate an n-phase alternating voltage directly and preferably without an inverter. Such a battery line, which actually generates the lowest instantaneous voltage of the n-phase alternating voltage, can take up the rectified current of the range extender and as a result be charged. Since the lowest instantaneous voltage is generally applied to the n battery lines in an alternating fashion, the range extender charges the battery lines in an alternating fashion.

The controlled battery is preferably a lithium-ion battery.

According to a further aspect of the disclosure, the drive can comprise n diodes, wherein in each case one diode can be connected to one of the n battery lines and to the range extender, and wherein the diodes are connected in such a way that the battery lines can be charged, that is to say preferably in the direction of flow. The diodes prevent, in particular, the reverse flow of the current from one battery line into other battery lines, and vice versa. In one alternative embodiment, the drive comprises n semiconductor switches instead of the n diodes. In each case one semiconductor switch is therefore connected to one of the n battery lines and to the range extender. The semiconductor switches can preferably be switched in such a way that if an n-th semiconductor switch connects a predetermined battery line to the range extender, the other n−1 semiconductor switches disconnect the n−1 battery line from the range extender at that moment. In this way, a predetermined battery line can be charged. This is advantageous if, for example, one battery line has less charge than other battery lines. In particular, the n-semiconductor switches permit a battery line to be charged independently of whether the lowest instantaneous voltage of the n battery lines is present at this battery line.

The semiconductor switches comprise, for example, MOS-FETs (metal-oxide semiconductor field-effect transistors), IGBTs (bipolar transistors with an insulated gate electrode), thyristors or bipolar transistors.

According to a further aspect of the disclosure, the direct voltage converter is configured to generate a predetermined output current. As a result, the range extender can selectively provide a charging current which is compatible with the battery line which is to be respectively charged.

In addition it is preferred that n is equal to three. That is to say the drive forms a three-phase system. This is advantageous since three-phase components such as motors and generators of this design are generally cost-effective.

BRIEF DESCRIPTION OF THE DRAWINGS

Exemplary embodiments of the disclosure are explained in more detail on the basis of the drawings and the description which follows.

DETAILED DESCRIPTION

Figure 1:
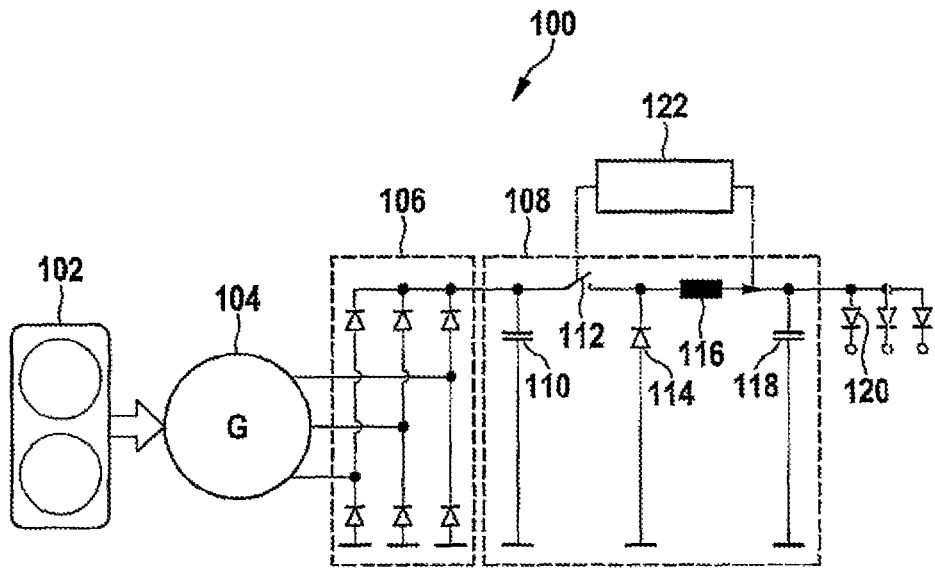
FIG. 1 shows and exemplary embodiment of an inventive range extender.

FIG. 1 shows a range extender 100 which comprises an internal combustion engine 102 and a generator 104 which is coupled to the internal combustion engine 102. The internal combustion engine 102 generates rotational energy which the generator 104 absorbs and converts into electrical energy. The generator 104 outputs the electrical energy in the form of a three-phase alternating voltage to a three-phase bridge rectifier 106 which generates therefrom a rectified output voltage or a rectified output current. The rectified output voltage passes through a step-down converter 108 and is applied there to an input filter capacitor 110 and to a series circuit composed of a switch 112 and a freewheeling diode 114. A series circuit composed of a an inductor 116 and an output filter capacitor 118 are also connected in parallel with the freewheeling diode. The output filter capacitor 118 generates a down-converted direct output voltage from the rectified output voltage.

A direct output current of the step-down converter 108 is detected by a regulator 122, for example by means of a current sensor. The regulator 122 regulates the switch 112 as a function of the direct output current of the step-down converter 108 in such a way that the step-down converter 108 provides a substantially constant direct output current. The constant direct output current is made available to a controlled battery 200 for charging, as shown in FIG. 2.

Figure 2:
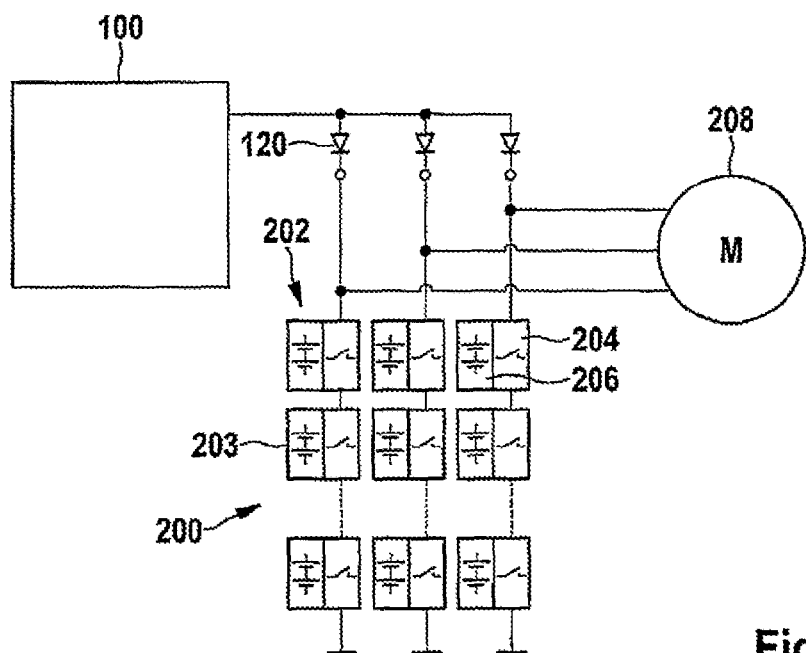
FIG. 2 shows an exemplary embodiment of a drive.

The battery 200 in FIG. 2 has three battery lines 202. In accordance with the three battery lines 202, the range extender is connected to the battery lines 202 via three diodes 120.

Each battery line 202 has a series circuit composed of a plurality of battery modules 203. Each battery line 202 forms a phase which is directly connected to a three-phase electric motor 208.

Each battery module 203 comprises a series circuit composed of a plurality of lithium-ion battery cells 206 and a coupling unit 204. The coupling unit 204 outputs the voltage of the lithium-ion battery cells series circuit 206, the inverted voltage thereof or a voltage of zero volts, wherein in this case the coupling unit 204 bypasses the lithium-ion battery cells series circuit 206. The series circuit of the coupling units 204 forms a battery line 202 which can, for example, generate an incremental alternating voltage. The controlled battery 200 can therefore directly drive the three-phase electric motor 208 without an inverter.

If the instantaneous voltage at one of the battery lines 202 is currently the lowest, the constant output voltage of the range extender 100 can charge this battery line 202. Since the lowest instantaneous voltage is alternatively present at the battery lines 202, the range extender 100 charges the battery lines 202 in an alternating fashion.

The range extender 100, the controlled battery 200 and the electric motor 208 form a hybrid drive which can be used, for example, in a motor vehicle.

What is claimed is:

1. A drive for a hybrid vehicle, comprising:
 a controlled battery including a plurality of battery lines configured to make available an N-phase alternating voltage where N is equal to a number of battery lines in the plurality, each of the battery lines being configured to generate a different phase of the N-phase alternating voltage;
 a first electric machine configured to drive the hybrid vehicle, wherein each of the battery lines is connected to the first electric machine to provide the respective phases of the N-phase alternating voltage to the first electric machine; and
 a range extender including
  (i) an output,
  (ii) a step-down converter configured to convert a rectified output voltage of an N-phase rectifier to a down-converted rectified direct output voltage which is made available at the output, wherein the step-down converter includes a first series circuit that has a switch and a diode and a second series circuit that includes an inductor and a capacitor, and
  (ii) a regulator configured to detect a rectified direct output current of the step-down converter and to regulate the step-down converter as a function of the detected direct output current so as to maintain the direct output current substantially constant,
 wherein the output of the range extender is connected to each of the battery lines such that the direct output current is applied to each of the battery lines in an alternating fashion, and
 wherein the direct output current is configured to charge each of the battery lines.

2. The drive according to claim 1, further comprising:
 N diodes,
 wherein each of the battery lines is connected to the output of the range extender by one diode of the N diodes, and
 wherein the N diodes are connected in such a way that the direct output number N of battery lines can be charged.

3. The drive according to claim 1, further comprising:
 N semi-conductor switches, wherein each of the battery lines is connected to the output of the range extender by semi-conductor switch of the N semi-conductor switches, and wherein the semiconductor switches are configured to be switched in such a way that the direct output current is applied to one of the battery lines at a time in an alternating fashion.

4. The drive according to claim 1, wherein the direct voltage converter is configured to generate a predetermined output current that is compatible with the battery line which is to be respectively charged.

5. The drive according to claim 1, wherein N is equal to three.

6. A hybrid motor vehicle comprising:
a drive including
  a controlled battery including a plurality of battery lines configured to make available an N-phase alternating voltage where N is equal to a number of battery lines in the plurality, each of the battery lines being configured to generate a different phase of the N-phase alternating voltage,
  a first electric machine configured to drive the hybrid vehicle, wherein each of the battery lines is connected to the first electric machine to provide the respective phases of the N-phase alternating voltage to the first electric machine, and
  a range extender including
    (i) a generator configured to generate a number N of generator output voltages,
    (ii) an internal combustion engine configured to drive the generator,
    (iii) an N-phase rectifier configured to rectify the number N of generator output voltages to form a rectified output voltage,
    (iv) a step-down converter including an output and configured to convert the rectified output voltage of the N-phase rectifier to a down-converted rectified direct output voltage which is made available at the output, wherein the step-down converter includes a first series circuit that has a switch and a diode and a second series circuit that includes an inductor and a capacitor, and
    (v) a regulator configured to detect a rectified direct output current of the step-down converter and to regulate the step-down converter as a function of the detected direct output current so as to maintain the direct output current substantially constant,
  wherein the output of the range extender is connected to each of the battery lines such that the direct output current is applied to each of the battery lines in an alternating fashion, and
  wherein the direct output current is configured to charge each of the battery lines.

* * * * *